United States Patent [19]

Christian

[11] 4,251,477
[45] Feb. 17, 1981

[54] ON-LINE FLUID INJECTING METHOD

[75] Inventor: Miles W. Christian, Plymouth, Ohio

[73] Assignee: Plymouth Locomotive Works, Inc., Plymouth, Ohio

[21] Appl. No.: 8,520

[22] Filed: Feb. 1, 1979

Related U.S. Application Data

[62] Division of Ser. No. 838,730, Sep. 29, 1977, Pat. No. 4,156,581.

[51] Int. Cl.³ ...................... B29C 25/00; B28B 21/94
[52] U.S. Cl. ..................................... 264/82; 264/561;
264/566; 264/101; 264/209.6; 264/211;
264/232; 264/330; 264/340
[58] Field of Search ............ 264/211, 209, 236, 82–83,
264/63, 86, 101–102, 330, 232, 340, 561, 566;
425/97, 85, 380

[56] References Cited
U.S. PATENT DOCUMENTS

| | | | |
|---|---|---|---|
| 1,858,620 | 5/1932 | Frandsen | 425/380 |
| 2,616,126 | 11/1952 | Merck et al. | 425/97 |
| 2,620,515 | 12/1952 | Olson | 264/557 |
| 2,690,592 | 10/1954 | Schanz | 264/209 |
| 3,054,142 | 9/1962 | Hinderer et al. | 264/236 |
| 3,069,727 | 12/1962 | Shramek | 264/209 |
| 3,549,737 | 12/1970 | Schulze | 264/82 |
| 3,686,070 | 8/1972 | Williams | 425/380 |

*Primary Examiner*—Jeffery R. Thurlow
*Attorney, Agent, or Firm*—Maky, Renner, Otto & Boisselle

[57] ABSTRACT

In the method of the present invention preferably an apparatus is connected directly on-line with an extruder to inject fluid into or to remove fluid from a fresh extrusion on a continuous basis as the latter is extruded. In one case the fluid injected is a catalyst that causes curing of a mixture of particulate matter and resin binder. In the method one part of a two part binder mechanism is mixed with a particulate material, and the mixture is extruded on a continuous basis. The second part of the binder then is injected into the fresh extrusion on a continuous basis downstream of the extruder output to cure the extrusion. The extruder die also may include fluid injecting paths, on the one hand, for injecting lubricant or, on the other hand, for injecting of the second binder part, e.g. catalyst, into the relatively less dense material near the upstream end of the die.

14 Claims, 2 Drawing Figures

ON-LINE FLUID INJECTING METHOD

This is a division of application Ser. No. 838,730, filed Sept. 29, 1977, now U.S. Pat. No. 4,156,581, issued May 29, 1979.

BACKGROUND OF THE INVENTION

The present invention relates generally, as indicated, to a method for on-line fluid injection into and/or removal from freshly extruded material preferably on a continuous basis as such material is extruded.

As used herein "extrude" means to force, press, push out, shape, or the like, a material by forcing the same through a die. An "extruder" or an "extruding machine" means an apparatus for performing the act of extruding. Moreover, "extrusion" means an article or material produced by the use of an extruder, and a "fresh extrusion" means an extrusion that has just been extruded. "Green strength" means the strength of a relatively fresh extrusion including the ability of the latter to maintain its extruded shape. "Fluid" is used in its generic sense to mean either a liquid or gas or other material that has fluid-like properties, e.g. capable of flowing, although as will be described further the preferred embodiment effects gas injection or removal.

To assure that a fresh extrusion has sufficient green strength, for example to hold its shape until finally cured, dried, fired, or otherwise finished, relatively close control of the formulations of ingredient materials, e.g. particulate matter, water, clay, and other materials, to an extruder, the rate of extruding, the pressures and temperatures used, etc. usually require relatively close control. With a too small green strength a fresh extrusion may lose its desired shape or in extreme cases could disintegrate. The use of extruding techniques to form shaped solids from particulate material ingredients or the like is usually substantially more efficient than casting techniques. Extruding generally is performed on a continuous basis, thus maximizing the efficiency of the equipment, labor, and often power requirements; whereas casting of particulate material ingredients to form a solid thereof is performed on a batch basis in which plural mixing, pouring, molding, removing, cleaning, and like operations must be individually and relatively inefficiently performed.

One material that may be extruded or cast is clay, which may be categorized either as a quasi-particulate or as a quasi-fluid material often having a property that tends to resist change of shape. Thus, a clay extrusion or casting usually will hold its shape relatively well. On the other hand, particulate materials, such as coal fines, metal mill scale, BOF dust and the like usually require the addition of a binder thereto to hold the many particles in fixed relation to retain a given extruded or cast shape. One such binder used in the past has been an asphalt type or petroleum-base type binder. However, such binders often are relatively slow in their curing, hardening, catalyzing, or solidifying characteristics, such terms being used generally synonymously herein. Such property, on the one hand, makes those binders useful in extruding, for the materials in the extruder ordinarily will not harden and damage the extruder or require substantial down time for cleaning in case the extruder encounters a brief failure causing shut down. On the other hand, though, such property reduces the efficiency of extruders, which would have to be operated at a sufficiently slow rate to assure that the fresh extrusion has a sufficient green strength to hold its shape.

Two part binders have been used in casting techniques. A typical two part binder includes, for example, a resin or like material, such as formaldehyde, vinyl, epoxy, or the like, and a catalyst, such as an amine, peroxide, or other hardener, respectively, for causing a solidication of formaldehyde, vinyl, or epoxy. In one casting technique using such two part binder, the particulate matter, and both ingredients of the binder, for example the epoxy and its catalyst, was thoroughly mixed and placed in a mold until the epoxy had cured to form the solid casting. Thereafter, the solid casting was removed from the mold, which would be cleaned and prepared for the next casting. However, in the past the use of such premixture of a two part binder, especially a fast curing one, in extruding processes could destroy the extruder or substantially damage the same requiring cleaning and/or repair if the extruder were to shut down briefly allowing the material therein to harden in situ. In another casting technique, known as the Acme process, particulate matter and one part, say the resin or epoxy, of a two part binder was mixed and the mixture placed in a mold. The mold was closed and the catalyst was injected under pressure to cause the batch of material therein to harden forming the solidified casting. In the second technique a closed mold was necessary to receive and to confine the injected catalyst, but such enclosure was not available with continuously operating extruders.

SUMMARY OF THE INVENTION

The present invention is directed to a method that provides for the injection or removal of fluid from a fresh extrusion. Injection and removal, insofar as the apparatus is concerned, may be substantially equivalent herein with one simply being the negative or opposite of the other. Using such method, for example, a two part binder mechanism similar to that previously useful only in the batch casting techniques now can be employed on a continuous on-line basis in an extruding technique while maintaining efficient operation of the extruder. For example, in accordance with the present invention a particulate matter ingredient can be premixed with one part, say epoxy, of a two part binder. That mixture then can be extruded substantially in ordinary manner, and downstream of the extruder die the second part, e.g. a catalytic hardener, may be injected into the fresh extrusion to effect solidifying, curing, hardening, or the like thereof to form a restructured article.

According to one aspect of the invention an on-line extension of the extruder provides support of the fresh extrusion while at the same time providing a delivery vehicle to inject catalytic hardener or the like. According to another aspect of the invention a sealing mechanism confines the catalytic hardener only to such extension area. Moreover, a feature of the invention permits injection of catalytic hardener or the like at interior and exterior surfaces of, for example, a hollow extrusion or, alternatively, the injection of such catalytic hardener at one surface and the drawing thereof through the extrusion material via a vacuum applied to a different surface thereof. Further, if desired, vacuum responsive fluid withdrawal from or the injection of other fluids into a fresh extrusion may be performed in accordance with the invention.

In accordance with another aspect of the invention fluid, e.g. the second part of the binder, may be injected at the extruder die or just upstream thereof. Although this technique risks the possibility that the extrusion material may harden in the die upon a failure shut down of the extruder, it does provide for more facile or efficient permeation of the fluid where the extrusion material is less dense than the fresh extrusion at the extruder die outlet.

Still another aspect of the invention features the injection of a lubricant at or just upstream of the extruder die to facilitate flow of the extrusion material through the die.

The invention will be described in detail below with reference to the extruding of coal fines, which is a particulate coal material usually considered a waste material in the past, in order to form a solidified extrusion thereof utilizing the method and apparatus of the invention thereby to create a useful coal product. However, it will be appreciated that such method and apparatus may be employed in extruding other materials, such as, for example, mill scale, i.e. the scale removed from steel billets or the like, BOF dust, i.e. that produced in basic oxygen furnace processes, and other particulate or quasi-particulate materials. Moreover, the method and apparatus of the invention may be employed similarly for fluid injecting and/or removal relative to any fresh extrusions on a continuous on-line basis with the extruder. It will also be understood that although the invention is described in detail below using a two part binder of epoxy resin and its associated catalyst or hardener, other similarly chemically responsive plural part binders may be used in accordance with the invention.

With the foregoing in mind, it is a primary object of the invention to inject and/or to remove fluid from an extrusion and, more particularly, to effect the same for a fresh extrusion on an on-line continuous basis relative to the extruder.

Another object is to provide for the catalyzation of a binder-like material on a continuous basis.

Still another object is to provide confinement of fluid material being continuously injected into and/or withdrawn from a fresh extrusion.

Still an additional object is to provide for the efficient solidification of particulate matter.

Still a further object is to facilitate the flow of material through an extruder die by lubricant injection.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the apparatus and method of the invention, this being indicative, however, of but one of the various ways in which the principles of the invention may be employed.

DESCRIPTION OF THE PREFERRED EMBODIMENT

Figure 1:
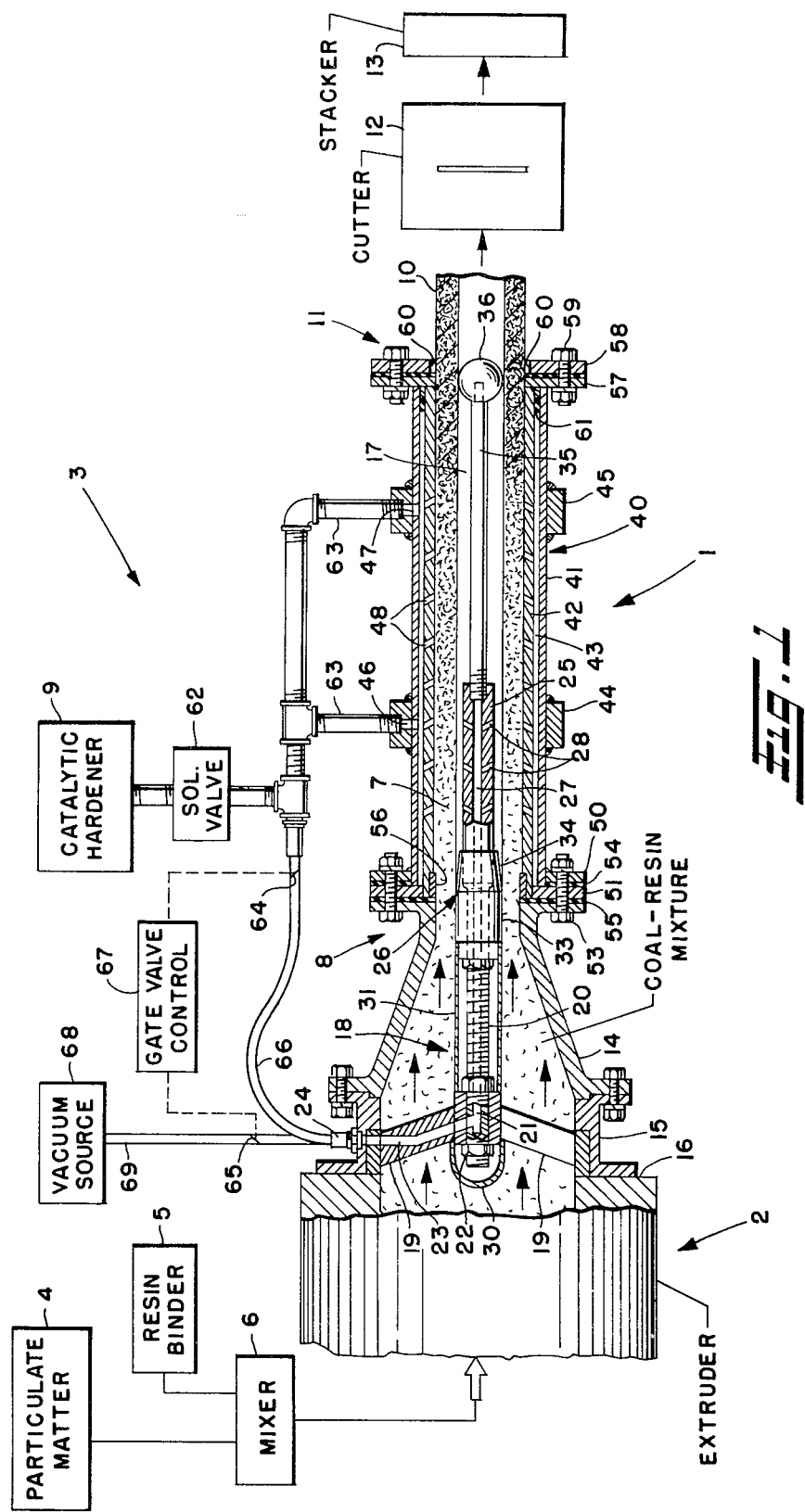
FIG. 1 is a side elevation view, partly broken away in section, of an on-line extension apparatus for injecting fluid into a fresh extrusion and an extruding system for use therewith.

Referring now in detail to FIG. 1, an on-line extension apparatus for injecting fluid into and/or removing fluid from a fresh extrusion is generally indicated at 1. The extension 1 is connected directly on line with a conventional extruder 2 as part of an extruder system generally designated 3. Particulate matter, such as coal fines or the like, from a hopper or other storage reservoir 4 is combined with a resin binder, such as epoxy or the like, from its reservoir 5 by a conventional mixer 6, for example including a muller, pug mill, or the like, to obtain a thorough mixing of those ingredients preferably such that the particles of coal fines are coated with the binder. The coal-resin mixture is delivered to the extruder 2, which is operative to form the same into an elongate generally cylindrical extrusion 7 that passes directly from the generally circular cross sectioned extruder outlet 8 into the extension 1. In the extension 1 a catalyst or catalytic hardener from its source 9 is injected into the fresh extrusion 7 to catalyze the resin binder thereof causing a sufficient curing so that the fresh extrusion output 10 that exits the system outlet 11 has a relatively strong green strength. That extrusion output may be cut to size by a conventional cutter 12 with the individual cut pieces then being stacked or otherwise stored by a conventional stacker 13.

The extruder 2 may be a well known extruder. Such an extruder may include, for example, a sealing die and sealing core through which the coal-resin mixture is delivered to a vacuum chamber that eliminates air therefrom. From the vacuum chamber the mixture may be fed to an auger, which is driven in well known manner, and the auger forces the mixture under pressure through the extruder die 14. The extruder die 14, as illustrated, is generally tapered, for example, as illustrated, of truncated conical form, and it is connected by a ring 15 to the frame 16 of the extruder 2. As the coal-resin mixture is forced under pressure through the extruder die 14, the fresh extrusion output 7 of the extruder is formed at the extruder outlet 8.

In the preferred embodiment it is desired that fresh extrusion 7 be generally of hollow cylindrical shape, and to obtain the hollow interior area 17 of the fresh extrusion a so-called torpedo 18 is mounted by two or more supports 19 to extend into the extruder die 14. Torpedoes have been used in connection with extruder dies in the past to obtain, as in the present case, hollow extrusions. However, in accordance with the present invention the torpedo provides a fluid connection with such hollow interior 17 of the extrusion 7 in the extension 1.

The torpedo 18 is formed by a pipe 20 that is threaded on its exterior surface and has a hollow interior passage 21. Nuts 22 secure the pipe 20 to the torpedo supports 19, and a passage 23 in one of those supports is fluidically coupled between the pipe passage 21 and a fitting 24 for fluid connection externally of the extruder 2, as will be described further. A manifold, such as pipe manifold 25, which is connected to the pipe 20, for example by threaded, soldered, welded, or like connection at 26, also has an interior passage 27 fluidically coupled to the pipe passage 21 and a plurality of ports 28 that couple such passage with the hollow interior 17 of the extrusion 7. To smooth the external profile of the torpedo 17 and to protect the nuts, pipe, and pipe manifold from direct engagement with the extrusion materials, a rounded end cap 30 is placed over the upstream nut 22, and a cylindrical cover 31 is mounted over a downstream portion of the pipe 20. Moreover, a sleeve 33, which has an exterior surface that preferably directly abuts the interior surface of the extrusion 7 forms a fluid tight seal therewith while at the same time shielding part of the pipe 21 and the connection 26 with the pipe manifold 25. The sleeve 33 is slightly tapered at its downstream end 34 to facilitate passage of the fresh extrusion 7 past the same through the extension 1. A rod 35 threadedly sealed in the pipe manifold 25 is supported by the latter and provides support for a ball seal 36 at the system outlet 11. Both the sleeve 33 and the ball seal 36 preferably are of resilient material, such as rubber, to provide good resilient engagement with the interior surface 37 of the extrusion 7 bounding the hollow interior 17 thereof thereby confining any fluid injected from the pipe manifold 25, for example, through the ports 28 to such hollow interior between the sleeve 33 and ball seal 36 to impede escape to the ambient environment.

The body 40 of the extension 1 is formed by a pair of concentric cylinders 41, 42 that are spaced apart to form a manifold area 43 therebetween. The outer cylinder 41 is generally imperforate and is circumscribed by a pair of ring reinforcements 44, 45 with inlet ports 46, 47 providing respective fluid passages through the rings and the outer cylinder to the manifold area 43. The inner cylinder 42 has a plurality of ports 48 through which fluid in the manifold 43 may pass for injection directly into the fresh extrusion 7 as it passes through the extension 1. The number of ports 48, as well as the number of ports 28 in the pipe manifold 25, and their circumferential distribution about the respective cylinder 42 and pipe manifold 25 may be varied, as desired, depending on the quantities of fluid to be injected or removed relative to the extrusion 7 in the extension 1. Additionally, the ports 28 and 48 preferably are formed at an angle relative to respective cross sectional radii of the extension 1 so that the portion of each port most proximate the extrusion 7 is located relatively further downstream than the portion of the port that opens into the respective manifolds 27, 43. Such angular relation impedes clogging of the ports by the extrusion material as it passes along through the extension 1. Also, since the extrusion 7 preferably is at least partly directly engaged with and supported by the inner wall of the cylinder 42, there are a relatively large number of ports 48 distributed over the length of that cylinder to assure adequate distribution of fluid into the extrusion. On the other hand, the diameter of the pipe manifold 25 is smaller than that of the hollow interior 17 of the extrusion 7 so that a relatively small number of ports 28 ordinarily would be needed to provide sufficient fluid connection between the manifold 27 and the volume within the hollow interior 17 between the sleeve 33 and ball seal 36.

A flange 50 welded to the outer cylinder 41, a flange 51 welded to the inner cylinder 42, and an integral flange 52 of the extruder die 14 are secured by several fasteners 53. Gasket-like seals 54, 55, for example of rubber, between respective flanges, maintain the fluid-tight integrity of the manifold 43 at the upstream end thereof. Another ring seal 56, for example of rubber or the like, is mounted in the interior wall of the inner cylinder 42 raised slightly above the cylindrical plane thereof for resiliently directly engaging the outer surface of the extrusion 7 as it passes from the extruder outlet 8 into the extension 1 to provide a fluid seal relationship therewith, thus blocking the flow of fluid injected through the ports 48, for example, from flowing upstream into the extruder die 14. Another flange 57 welded to both cylinders 41, 42 at their downstream ends and a sealing outlet plate 58 are secured together by bolt fasteners 59 at the system outlet 11 at the downstream end of the extension 1, and a resilient, for example rubber, ring seal 60 circumscribing an interior opening of the outlet plate 58 forms a final seal with the outer surface of the cylindrical extrusion 7 further to confine injected fluid to the extension 1 preventing escape to the ambient environment. A further resilient ring seal 61 in the manifold 43 between the cylinders 41, 42 near the junctures thereof with the flange 57 further maintains the fluid-tight integrity of such manifold.

Catalytic hardener from the supply or source 9 is delivered via a conventional solenoid shut-off valve 62 and supply pipes 63 to the manifold 43 through respective inlet ports 46, 47. Moreover, when a gate valve 64 is open, and another valve 65 is closed, such catalytic hardener also may be provided via a supplemental supply pipe 66 to the pipe manifold 27 via the feed fitting 24, support passage 23, and pipe passage 21. A gate valve control 67 which may be a manual controller, a solenoid operated controller, or other conventional control mechanism, preferably operates the gate valves 64, 65 simultaneously, but in opposition. Accordingly, when gate valve 64 is open to provide catalytic hardener to the pipe manifold 27, the gate valve 65 will be closed. However, in the alternate condition, i.e. when the gate valve 64 is closed and the gate valve 65 is open by the control 67, a vacuum source 68 is coupled via a vacuum pipe 69 to the feed fitting 24 to provide a vacuum in the pipe manifold 27 and, accordingly, in the hollow interior 17 of the extrusion 7 between the sleeve 33 and the ball seal 36. Such vacuum would be employed to draw catalytic hardener provided from the manifold 43 and the ports 48 through the cylindrical wall of the extrusion 7. Accordingly, in the first-mentioned condition of the gate valves 64, 65, catalytic hardener is supplied through the ports 28 and 48 to the interior and exterior surfaces of the extrusion 7 in the extension 1. In the second-mentioned condition of the gate valves 64, 65 catalytic hardener is supplied only through the exterior ports 48 and is drawn through the extrusion wall toward the hollow interior 17 thereof. It will also be appreciated that a similar mechanism may be provided to supply a vacuum connection both to the pipe manifold 27 via the feed fitting 24 and to the manifold 43, for example, by a connection, not shown, from the vacuum source 68 to the supply pipes 63, with such latter arrangement being useful, for example, to withdraw fluids from the extrusion in the extension 1.

It will be appreciated that the quantity of resin binder and that of the catalytic hardener required to solidify the extrusion 7 formed primarily of the particulate matter from the reservoir 4 will depend on the density of the particulate matter and its mixture with the resin binder, the grain size of the particulate matter, the pressures and rates at which the extruding process is operated, the particular resin binder and catalytic hardener used, etc., all of which may readily be determined in obvious manner by those persons having ordinary skill in the art. However, in the preferred embodiment the resin binder preferably is provided as a liquid that mixes well with the particulate matter coal fines, for example to provide a well dispersed coating on the particles thereof, and the catalytic hardener is provided as a gas to facilitate its injection and permeation into the body of the extrusion 7. However, it will be appreciated that the first binder part from the reservoir 5 may be provided in other than liquid form, such as, for example, particulate form as a powder, gas, or the like, and the catalyst may be injected as either a liquid or a gas satisfactory to activate the first binder part.

In view of the foregoing it will be appreciated that the extension 1 is connected on-line with an extruder in an extruder system to provide for the injection or removal of fluid relative to a fresh extrusion. The various seals employed confine the injected fluid or that removed to a particular portion of the extension 1 to preclude permeation into the extruder die, for example, or exteriorly of the extension 1 beyond the system outlet 10. Accordingly, the two-part binders, such as combinations of epoxy and a catalytic hardener, vinyl with peroxide catalyst, formaldehyde with an amine catalyst, etc. may be employed in a continuous, efficient, on-line technique to produce a fresh extrusion output 10 that has a relatively high green strength. Thus, in accordance with the method of the invention, for example using the on-line extension 1, an input material, such as the coal-resin mixture is continuously extruded to form a shaped extrusion, e.g. the hollow cylinder 7 or other solid or hollow simple or complex shape, and a catalyst is continuously delivered to such fresh extrusion to cause relatively rapid curing, hardening, solidifying, etc. thereof.

Figure 2:
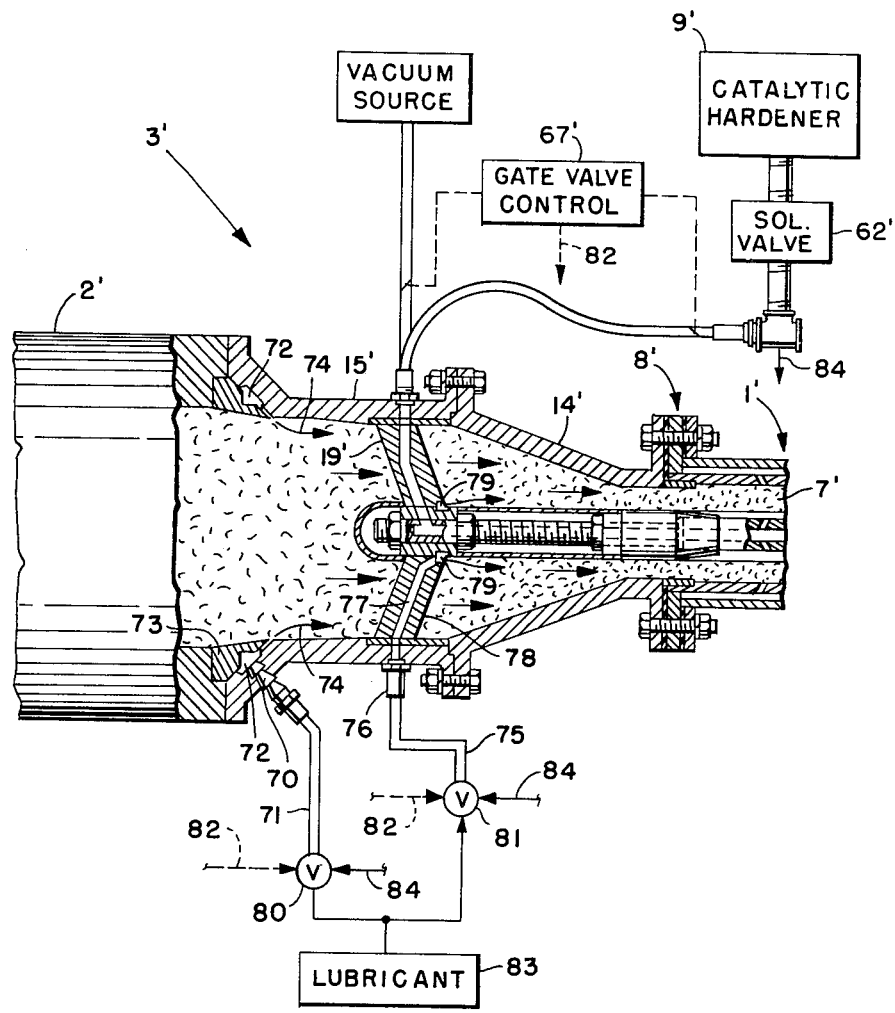
FIG. 2 is a partial side elevation view, partly broken away in section, of a modified extruder die and ring coupling, for example, for use with the extruder and/or extension of FIG. 1.

In FIG. 2, wherein primed reference numerals designate parts that correspond generally to those of the same number described above relative to FIG. 1, a portion of a modified extruder system 3' is illustrated. The modified extruder system 3' includes an extruder die 14', ring 15' and torpedo supports 19' that provide for the injection of fluid into the extrusion material at or just upstream of the extruder die. The upstream portions of the extruder 2' relative to the extruder die 14' and the extension 1' are similar to those described above with reference to FIG. 1.

However, in the system 3' illustrated in FIG. 2, the ring 15' includes a first fluid passage 70 coupled at one end by a conventional fluid connector to a fluid line 71 and at the other end to a circumferential or annular passage 72 in a supplemental ring 73. Fluid provided in the line 71 continues through the passage 70 into the passage 72 and under pressure is forced through a small clearance between the supplemental ring 73 and the ring 15' in the direction of the arrows 74 into the flowing extrusion material. Similarly fluid in a fluid line 75 is coupled via a conventional fitting 76, which passes through the ring 15', into a passage 77 in one of the torpedo supports 78. A small annular or circumferential groove 79 in the torpedo support 19' delivers fluid under pressure from the passage 77 into the extrusion material interiorly of the latter.

Valves 80, 81, which may be selectively controlled by the gate valve control 67', as indicated by the connection 82, in one operative mode couple a supply of lubricant 83 to the lines 71, 75 for injection into the extrusion material. Such lubricant facilitates the flowing of the extrusion material through the extruder die 14' as such material is compressed to the shape of the green ware fresh extrusion 7' delivered from the extruder outlet 8' into the extension 1'. Such lubricant may be, for example, oil or other lubricating material that provides the desired lubricating function. Such lubricating effectively at both the inner and outer walls of the green ware 7' entering the extension 1' ordinarily would not impede the fluid injecting operation occurring in the extension to harden or cure the green ware.

It is well known that the extrusion material or ingredients upstream of the extruder die 14' ordinarily has a lower density than that of the green ware 7' downstream of the extruder die. Therefore, if desired, the catalytic hardener from the supply 9' and solenoid valve 62' may be provided via connections 84 to the valves 80, 81 for delivery through the lines 71, 75 ultimately for injection into the relatively porous or less dense extrusion material at or just upstream of the extruder die 14' in the same manner that the above-described lubricant was injected. The gate valve control 67', accordingly, may operate the valves 80, 81 to cut off connection to the lubricant supply 83 and to provide appropriate connections to receive the second binder part. Although this technique for injecting the second binder part risks a possibility that the extrusion material may harden in the die 14' in case of a prolonged shut down of the extruder system 3' without cleaning the extruder die, the second binder part may more efficiently permeate the relatively more porous or less dense extrusion material at the upstream end of the extruder die to assure full curing downstream thereof in one case with and, alternatively, in another case without the added fluid injecting function of the extension 1'.

Thus, it will be appreciated that the additional fluid injection capability at or just upstream of the extruder die 14' as described above with reference to FIG. 2 may be employed as a supplement to the function of the extension 1' in the extruder system 3' or as an alternate in place of such extension.

I, therefore, particularly point out and distinctly claim as my invention:

1. A method for continuously extruding material to produce a relatively strong extrusion, comprising continuously extruding an input material containing a binding agent, which requires delivery thereto of a further agent to complete the function of such binding agent to bind such input material, to form a shaped extrusion, and continuously delivering such further agent to such shaped extrusion to cause relatively rapid hardening of such binding agent to complete such binding function.

2. The method of claim 1, wherein said step of continuously extruding comprises continuously extruding a hollow shape extrusion, and wherein said step of continuously delivering comprises continuously delivering such further agent to the interior volume of such extrusion.

3. The method of claim 1, wherein said step of continuously extruding comprises continuously extruding a hollow shape extrusion, and said step of delivering comprises delivering such further agent to an exterior surface of such extrusion, and further comprising applying a vacuum to the interior volume of such extrusion to tend to draw such further agent into such extrusion.

4. The method of claim 1, further comprising the step of confining such further agent to such extrusion downstream of the extruder in which said step of continuously extruding is carried out.

5. The method of claim 1, wherein said step of continuously delivering comprises continuously delivering a gaseous catalyst to such shaped extrusion.

6. The method of claim 1, wherein said step of continuously delivering comprises continuously delivering such further agent to such shaped extrusion downstream of the extruder in which said step of continuously extruding is carried out.

7. The method of claim 6, further comprising delivering a lubricant to such input material proximate an upstream portion of the extruder die of the extruder to facilitate passage of such input material through such die.

8. The method of claim 7, wherein said step of continuously extruding comprises continuously extruding a hollow shape extrusion, and said step of delivering lubricant comprises delivering lubricant to surfaces of such die facing interior and exterior walls of such input material as it is extruded into such shaped extrusion.

9. The method of claim 1, wherein said step of continuously extruding comprises continuously extruding a hollow shape extrusion and said step of delivering comprises delivering such further agent to at least one of the exterior surface and interior surface of such hollow shape extrusion, and further comprising applying a vacuum to the other of such exterior surface and interior surface to tend to draw such further agent into such extrusion.

10. The method of claim 1, further comprising directly supporting such extrusion over a distance downstream of the extruder in which said step of continuously extruding is carried out while such relatively rapid hardening occurs.

11. The method of claim 10, wherein said step of continuously delivering comprises delivering such further agent to such extrusion while the latter is directly supported along at least part of such distance.

12. A method for continuously extruding material to produce a relatively strong extrusion, comprising continuously extruding an input material containing a binding agent to form a shaped extrusion, and continuously delivering a catalyst to such shaped extrusion to cause relatively rapid hardening of such binding agent, and wherein said step of continuously extruding comprises mixing a particulate material with one part of a plural part binding agent which requires addition of a second part of such plural part binding agent to complete the function of such binding agent to bind such particulate material, and said step of continuously delivering comprises continuously delivering a catalyst forming a second part of such binding agent.

13. The method of claim 12, wherein said step of continuously delivering a catalyst comprises delivering such catalyst to such input material proximate an upstream portion of the extruder die of the extruder carrying out said step of continuously extruding.

14. The method of claim 13, wherein said step of continuously extruding comprises continuously extruding a hollow shape extrusion, and said step of continuously delivering a catalyst comprises delivering such catalyst to surfaces of such die facing interior and exterior walls of such input material as it is extruded into such shaped extrusion.

* * * * *